(12) United States Patent
Hirose (10) Patent No.: US 7,321,934 B2
(45) Date of Patent: Jan. 22, 2008

(54) REMOTE CONTROL RELAY DEVICE, RECORDING AND PLAYBACK APPARATUS, AND METHOD FOR UPDATING CONTROL DATA

(75) Inventor: Koji Hirose, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 804 days.

(21) Appl. No.: 10/396,470

(22) Filed: Mar. 26, 2003

(65) Prior Publication Data

US 2003/0217167 A1 Nov. 20, 2003

(30) Foreign Application Priority Data

Mar. 27, 2002 (JP) ............................ P2002-087853

(51) Int. Cl.
*G06F 15/16* (2006.01)
*G06F 7/04* (2006.01)
*G06F 1/00* (2006.01)

(52) U.S. Cl. ........................................ 709/229; 726/36
(58) Field of Classification Search ................ 709/229, 709/249, 228; 726/2–4, 36; 713/193–194
See application file for complete search history.

(56) References Cited

U.S. PATENT DOCUMENTS

| | | | |
|---|---|---|---|
| 6,139,177 A * | 10/2000 | Venkatraman et al. | 700/83 |
| 6,182,094 B1 * | 1/2001 | Humpleman et al. | 715/513 |
| 6,542,472 B1 | 4/2003 | Onuma | |
| 6,567,915 B1 * | 5/2003 | Guthery | 713/168 |
| 7,024,473 B2 * | 4/2006 | Parent | 709/223 |

2001/0032273 A1 10/2001 Cheng

FOREIGN PATENT DOCUMENTS

| | | |
|---|---|---|
| EP | 0793225 | 9/1997 |
| EP | 1133188 | 9/2001 |
| GB | 2265792 | 10/1993 |
| JP | 2000-217167 | 8/2000 |
| JP | 2000-222264 | 8/2000 |
| WO | 97/18636 | 5/1997 |

OTHER PUBLICATIONS

English Language Abstract of JP 2000-217167.
English Language Abstract of JP 2000-222264.
G. Lawton, "Dawn of the Internet Appliance", Computer, IEEE Computer Society, Long Beach, CA, vol. 30, No. 10, Oct. 1, 1997.

* cited by examiner

*Primary Examiner*—Glenton B. Burgess
*Assistant Examiner*—Philip Chea
(74) *Attorney, Agent, or Firm*—Greenblum & Bernstein, P.L.C.

(57) ABSTRACT

A remote control relay device is connected between a network and a controlled device. The controlled device is remotely controlled from an external device over the network. The remote control relay device includes a communication controller, a storage memory, a control memory and a write controller. The communication controller exchanges control data with the external device over the network. The storage memory stores control data. The control memory stores control data used for external device authentication. The write controller controls sending and receiving of control data by the communication controller, reading of control data stored in the storage memory, and writing of control data to the control memory. The write controller reads and writes control data from the storage memory to the control memory only in response to operations that are not executed over the network.

2 Claims, 10 Drawing Sheets

PRIOR ART

Fig.11

PRIOR ART

Fig.12

REMOTE CONTROL RELAY DEVICE, RECORDING AND PLAYBACK APPARATUS, AND METHOD FOR UPDATING CONTROL DATA

BACKGROUND OF THE INVENTION

1. Field of the Invention

The present invention relates to a remote control relay device for handling information specific to a user or equipment when operating a specific device from a remote location.

2. Description of Related Art

Web servers, routers, gateways, and other network devices are examples of equipment enabling two-way remote operation such as for changing settings by communicating with an external device in a remote location. These network devices are Web-enabled for accessing the Internet (World Wide Web (also "Web" below)) and can be controlled from an external device with a Web browser function using HTTP (Hypertext Transfer Protocol) or other protocol.

Web-enabled as used herein means a function enabling reading data from a device in a remote location (a "remote device") or for operating that remote device.

A Web browser function means a function for displaying data read from a remote device over the network.

Web-enabled remotely-controlled devices are increasingly incorporated into a variety of products for recording and playing back various kinds of information. The IP (Internet protocol) address uniquely identifying the remotely-controlled device and external device, and an ID and password uniquely identifying the user are needed to control this remotely-controlled device from an external device over a network, and this information can be viewed and changed using a Web browser. See, for example, Japanese Laid-Open Patent Publication No. 2000-217167.

Public file recovery systems for replacing the content of a public file with the content of the same file stored internally when the content of the public file accessible via the network has been illicitly changed are also known. See, for example, Japanese Laid-Open Patent Publication No. 2000-222264.

Figure 11:
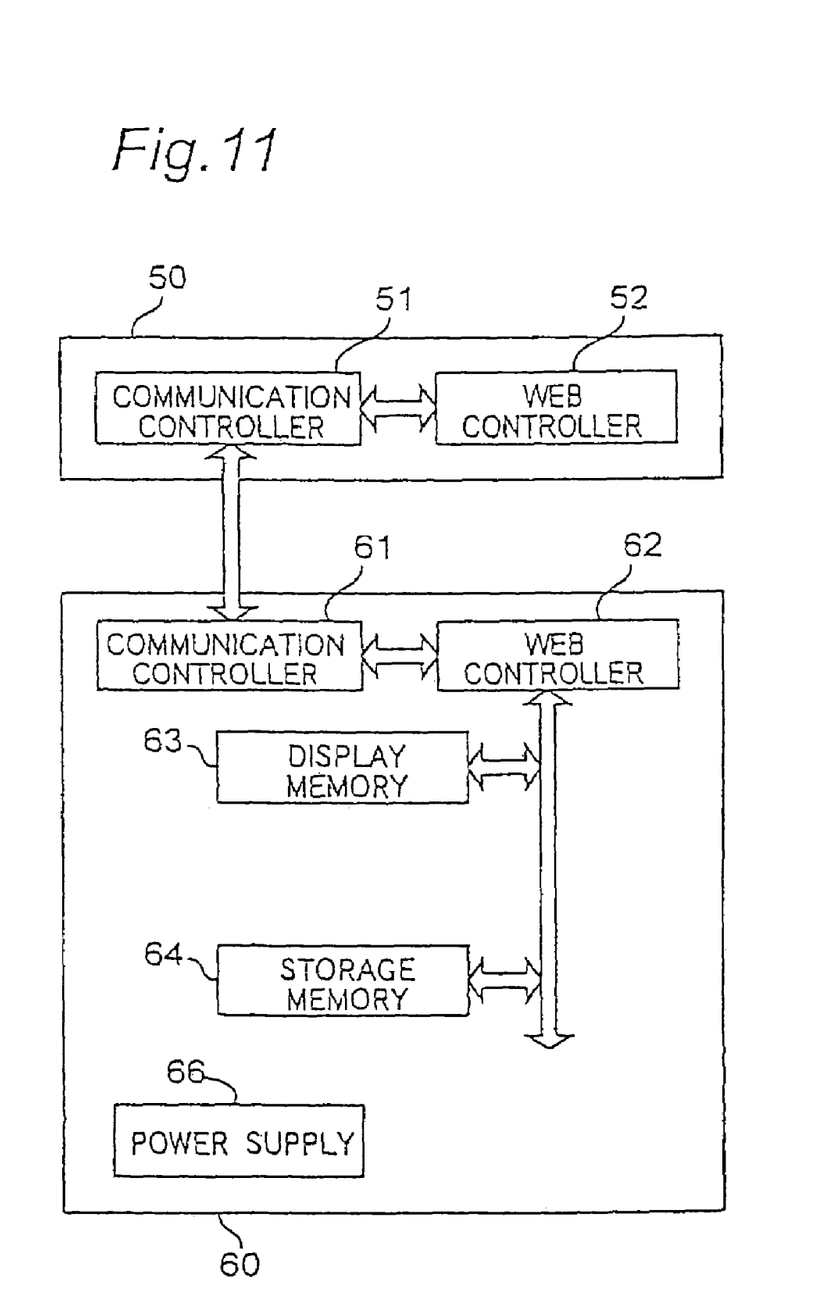
FIG. 11 is a schematic block diagram showing the configuration of a remotely-controlled device according to the prior art.

A remotely-controlled device according to the prior art is described next below with reference to FIG. 11. FIG. 11 is a schematic block diagram showing the configuration of a remotely-controlled device according to the prior art. A Web-enabled recording/playback device (referred to below as a "data player") is used by way of example as the remotely controlled device. The remotely-controlled device 60 has a communication controller 61, display memory 63, data storage memory 64, Web controller 62, and power supply 66.

The functions of these component parts are described next. The communication controller 61 communicates with an external device 50 that can display and manipulate a Web browser over a network. Data is buffered to the display memory 63, and data is stored to the data storage memory 64. The Web controller 62 controls communication controller 61, display memory 63, and data storage memory 64, and communicates with the external device 50 and displays Web content over the network.

The external device 50 could be a Web-enabled cell phone or a personal computer with Web access, and has a communication controller 51 for communicating with the remotely-controlled device 60 over a network, and a Web control unit 52 able to display Web content.

Figure 12:
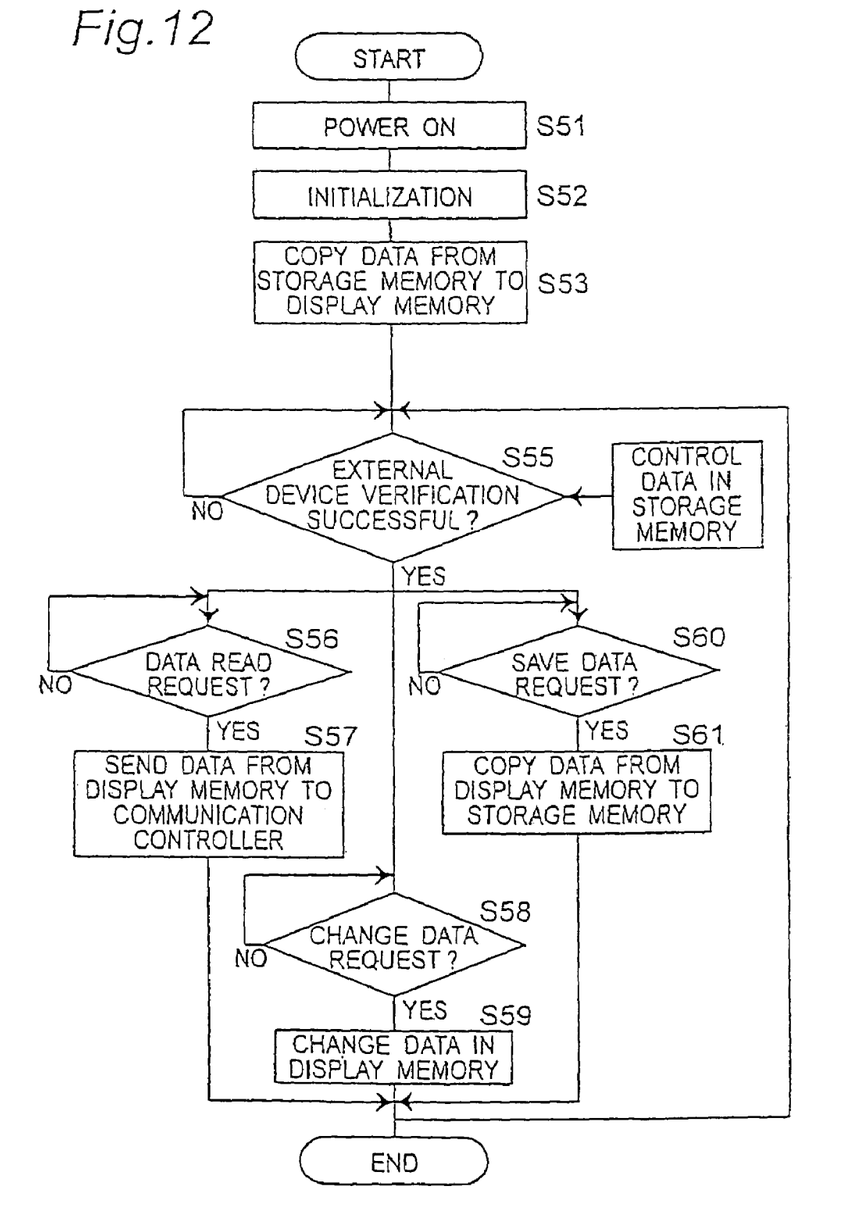
FIG. 12 is a flow chart describing the operation of the remotely-controlled device according to the prior art.

FIG. 12 is a flow chart of the operation of the Web controller 62.

(1) In step S51 the remotely-controlled device 60 is turned on.

(2) In step S52 various default settings of the remotely-controlled device 60 are initialized.

(3) In step S53 data stored in the data storage memory 64 is copied to the display memory 63.

(4) Step S55 is a verification step for determining if the external device 50 or the user of the external device 50 is an authorized user.

(5) Step S56 is a reference request detection step for detecting requests from the external device 50 to reference data.

(6) Step S57 is a data transmission step for sending data in display memory 63 to the external device 50 when a data reference request from the external device 50 is detected.

(7) Step S58 is a change request detection step for detecting a request from the external device 50 to change data.

(8) Step S59 is a change-data step for changing data in the display memory 63 when there is a change-data request from the external device 50.

(9) Step S60 is a storage request detection step for detecting requests from the external device 50 to save data.

(10) Step S61 is a data storage step for storing data in the display memory 63 to the data storage memory 64 when a data storage request is detected from the external device 50.

Operation of this remotely-controlled device is further described below with reference to FIG. 12.

(a) First, in the power-on step S51, the remotely-controlled device is turned on.

(b) Next, in step S52 various default settings required for operation of the remotely-controlled device 60 are set to specific initial values.

(c) Next, data stored in the data storage memory 64 is read and stored to the display memory 63 (S53).

(d) After the remotely-controlled device 60 is thus set up and then accessed from an external device 50, step S55 confirms if the protocol received from the external device 50 can be used with the remotely-controlled device 60, and if it can then a user verification process is run to confirm whether the external device 50 or the external device 50 user is an authorized user recognized by the remotely-controlled device 60 (S55). This assures the security of data stored in the remotely-controlled device 60.

Protocol verification and user authentication are done by reading control data from the data storage memory 64 to the communication controller 61, and comparing this read control data with data such as the user ID and password received from the external device 50.

This control data means data used to enable communication with the device attempting communication (access), i.e., data essential to the communication protocol. For example, this control data is typically a user ID, password, or other data unique to a specific user, and the IP address or other data unique to the device. Data other than this control data is differentiated herein as "display data."

If the protocol from the external device 50 is determined incompatible (unusable) by the remotely-controlled device 60 in step S55, or if the external device 50 user cannot be authenticated, the user is unable to access and use the Web controller 62 of the remotely-controlled device 60. Authenticated users can access and operate the Web controller 62 of the remotely-controlled device 60.

Next, if verification and authentication are successful in step S55 and the Web controller 62 can be used from the external device 50, what the protocol from the external device 50 is requesting of the remotely-controlled device 60 is determined and the Web controller 62 operates according to the request. The external device 50 user can thus perform the following three operations with the remotely-controlled device 60.

(e) First, data stored in the display memory 63 can be referenced. Requests from the external device 50 to reference data are passed through the communication controller 61 to the Web controller 62. These requests are detected in the reference request detection step (S56). Then in the data transmission step (S57), the Web controller 62 controls reading the data requested by the external device 50 from the display memory 63 to the communication controller 61, and sending the data from the communication controller 61 to the external device 50.

(f) Second, data stored in the display memory 63 can be changed. Requests from the external device 50 to change data are passed through the communication controller 61 to the Web controller 62. These requests are detected in the change request detection step (S58). The Web controller 62 then controls writing the changed data or new data to the display memory 63 through the communication controller 61 and Web controller 62 in step S59. The changed data or new data that is written may include control data.

(g) Third, data in the display memory 63 can be copied to the data storage memory 64. Data storage requests from the external device 50 are passed through the communication controller 61 to the Web controller 62. These requests are detected in the storage request detection step (S60). Next, in the data storage step (S61) data in the display memory 63 is copied to the data storage memory 64 by the Web controller 62. Data stored at this time could also include control data.

(h) When operation by the user of the external device 50 ends, the remotely-controlled device 60 waits for a next access from the external device 50, and the Web controller 62 stops operating if the remotely-controlled device 60 power is turned off.

A problem with this conventional system described above is that if an unauthorized user passes authentication, the unauthorized user can change data, including control data, in the data storage memory 64 by way of changing data in the display memory 63 of the remotely-controlled device 60 from the external device 50. This means that a falsely authenticated unauthorized user can freely change control data in the data storage memory 64 before the authorized user becomes aware of the unauthorized access. Control data in the data storage memory 64 is used for authentication in the verification step S55. Therefore, if data in the data storage memory 64 is changed by an unauthorized user, an authorized user may fail authentication and become unable to operate the remotely-controlled device 60 from the external device 50. This is an obvious security problem.

SUMMARY OF THE INVENTION

The present invention is therefore directed to assuring that authorized users can always access the remotely-controlled device even if an unauthorized user penetrates the remotely-controlled device over a network to tamper with the control data, such as the password.

To achieve this object a remote control relay device according to the present invention is connected between a network and a device that is remotely controlled from an external device over the network, and has a communication controller for exchanging control data with the external device over the network, storage memory for storing the control data, control memory for storing control data used for authenticating external devices, and a write controller for controlling sending and receiving control data by the communication controller, reading control data stored in the storage memory, and writing control data to the control data memory. The write controller reads and writes control data from the storage memory to the control memory only in response to operations that are not executed over the network.

The remote control relay device of this invention can therefore always assure access by authorized users from an external device even if an unauthorized user penetrates the system over the network.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become readily understood from the following description of preferred embodiments thereof made with reference to the accompanying drawings, in which like parts are designated by like reference numeral, and in which.

DESCRIPTION OF THE PREFERRED EMBODIMENTS

Preferred embodiments of a remote control relay device, recording and playback apparatus, and remote control method according to the present invention are described below with reference to the accompanying figures. It should be noted that effectively identical parts are identified by the same reference numeral in the accompanying figures and below.

Embodiment 1

A remote control relay device according to a first embodiment of the present invention is described below with reference to FIG. 1 and FIG. 3.

Figure 1:
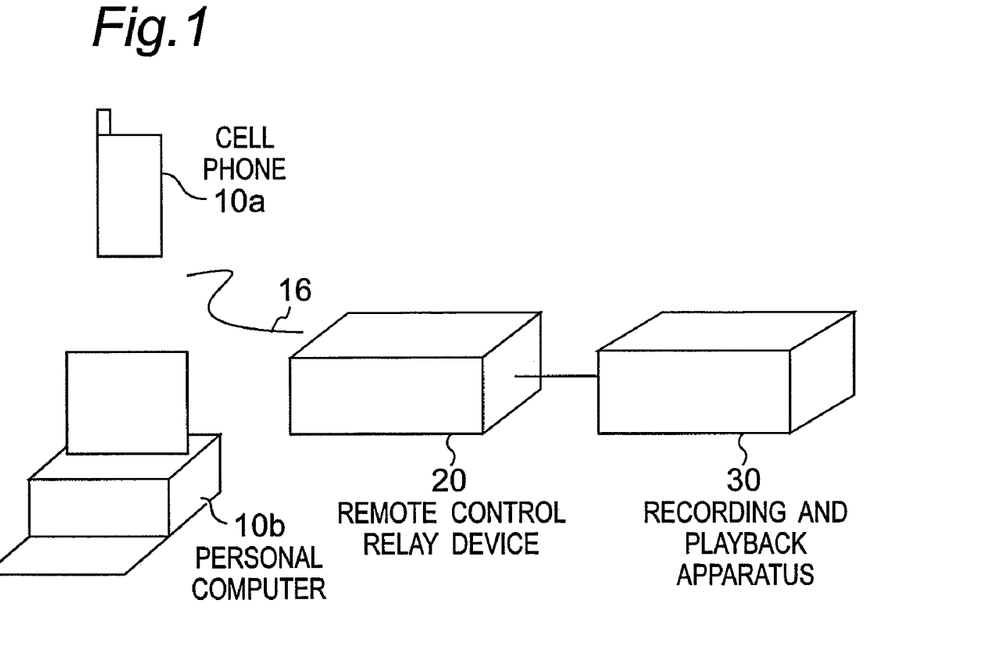
FIG. 1 is a block diagram showing the configuration of a remote control system in a first embodiment of the present invention.

FIG. 1 is a block diagram showing the configuration of a remote control system including a remote control relay device according to the present invention and a recording and playback apparatus. FIG. 3 is a block diagram showing the configuration of this remote control relay device in detail.

As shown in these figures this remote control system includes an external device 10 such as a cell phone 10a or a personal computer 10b, a recording and playback apparatus 30 that is remotely operated from the external device 10 over a network 16, and a remote control relay device 20 connected between the network 16 and recording and playback apparatus 30.

The remote control relay device 20 is described first.

Figure 3:
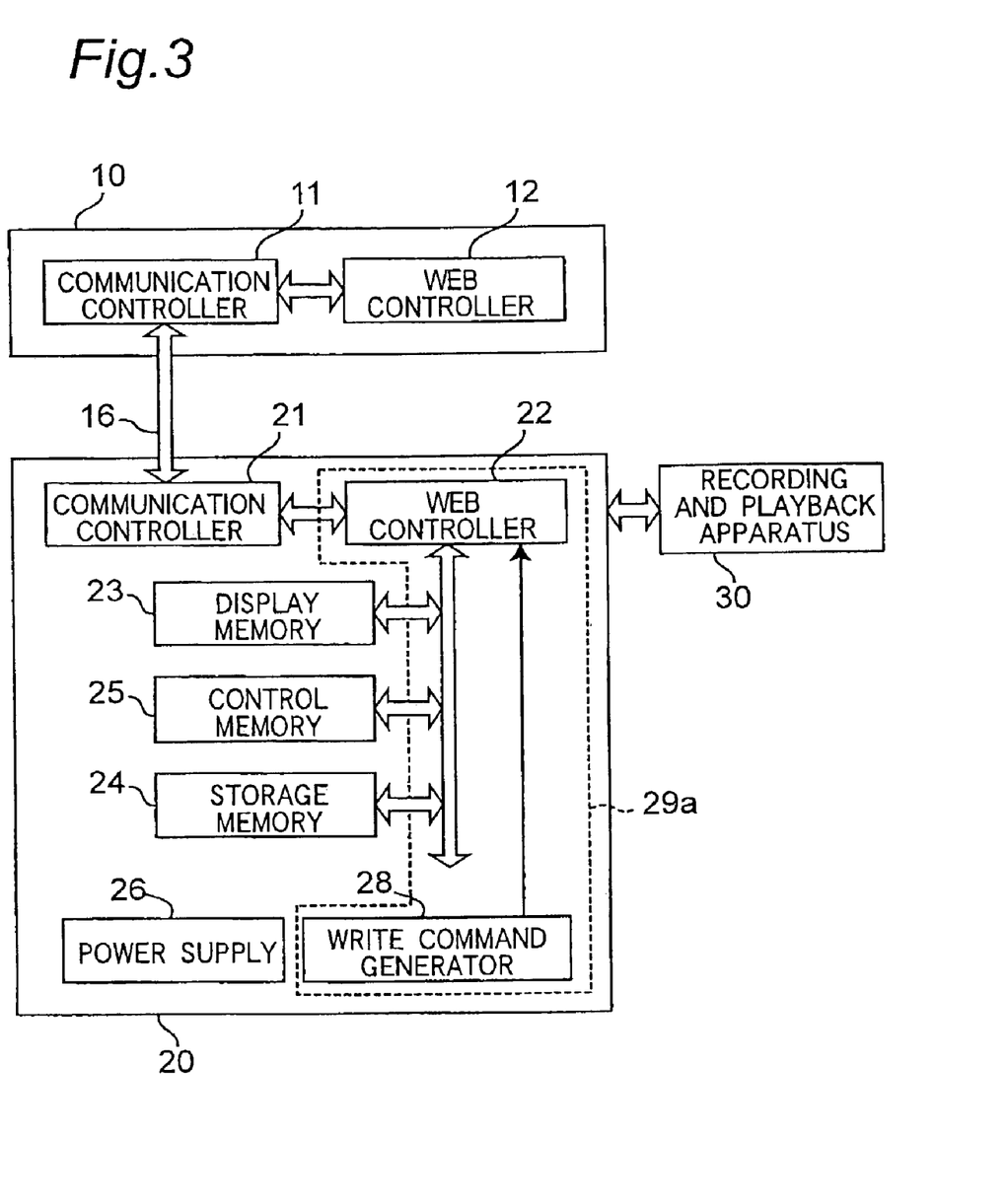
FIG. 3 is a block diagram showing the configuration of the remote control system shown in FIG. 1 in detail.

As shown in FIG. 3 the remote control relay device 20 has a communication controller 21, Web controller 22, display memory 23, control memory 25, storage memory 24, power supply 26, and write command generator 28.

The communication controller 21 is hardware or software for exchanging communication data related to the Web display with an external device 10. The communication controller 21 sends and receives data using a medium, such as telephone lines, electromagnetic waves, or optical fiber, appropriate to the external device 10 according to determined protocol, such as transmission control protocol/Internet protocol(TCP/IP).

The Web controller 22 generates, changes, and stores the Web display data communicated with the external device 10. The Web controller 22 also reads data from the display memory 23, and can display the Web screen on the external device 10 by sending the data from the communication controller 21 over the network 16 to the external device 10. Communication between the remote control relay device 20 and external device 10 is also possible by the communication controller 21 reading control data from the control memory 25. The display memory 23, control memory 25, and storage memory 24 are all readable/writable storage means such as a hard disk drive, optical disc storage drive, or semiconductor memory. Preferably, the storage memory 24 may be non-volatile recording medium, such as EEPROM, flash memory.

The write command generator 28 is a circuit for sending a write command. This write command generator 28 could be a button, lever, or other switch means. The Web controller 22 and write command generator 28 could also be combined as a single writing control unit 29a.

The recording and playback apparatus 30 that is remotely controlled over the network 16 is described next. The recording and playback apparatus 30 is not connected directly to the network 16, but is instead connected to the network 16 through the remote control relay device 20. This recording and playback apparatus 30 has a Web-access function. More specifically, the recording and playback apparatus 30 can be programmed for timer recordings over the network 16 using the external device 10, or the time recording program, and any other apparatus can be viewed and confirmed over the network.

It should be noted that while a recording and playback apparatus is used by way of example here as a remotely-controlled device, the invention shall obviously not be so limited. The remotely-controlled device could, for example, be various other electrical or electronic products, including lighting fixtures, air conditioning equipment, audio equipment, or video equipment.

The external device 10 is descried below.

The external device 10 has a communication controller 11 and a Web controller 12. The external device 10 is Web-enabled and has a Web browser function for displaying and manipulating content through a Web browser.

The communication controller 11 is hardware or software for exchanging communication data relating to a Web display with the remote control relay device 20. A Web display as used herein means a display screen presented on the external device 10 by the Web browser function. Web-enabled refers to a the ability to read data from a device in a remote location or operate the remote device over a network. The Web controller 12 is hardware or software for controlling the Web browser and displayed content.

Figure 4:
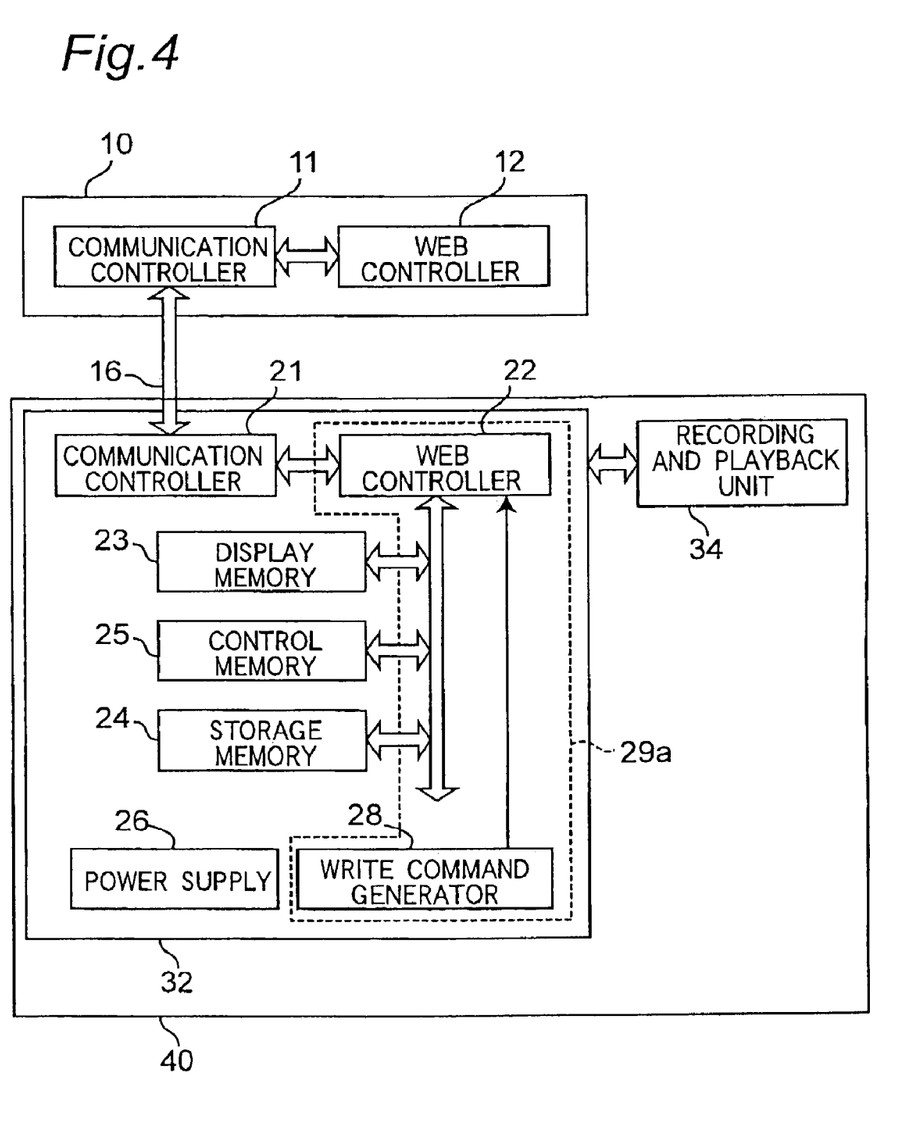
FIG. 4 is a block diagram showing the configuration of the remote control system shown in FIG. 2 in detail.

Another recording and playback apparatus 40 is described below as an alternative example of a remote control relay device according to this first embodiment of the invention with reference to FIG. 2 and FIG. 4.

Figure 2:
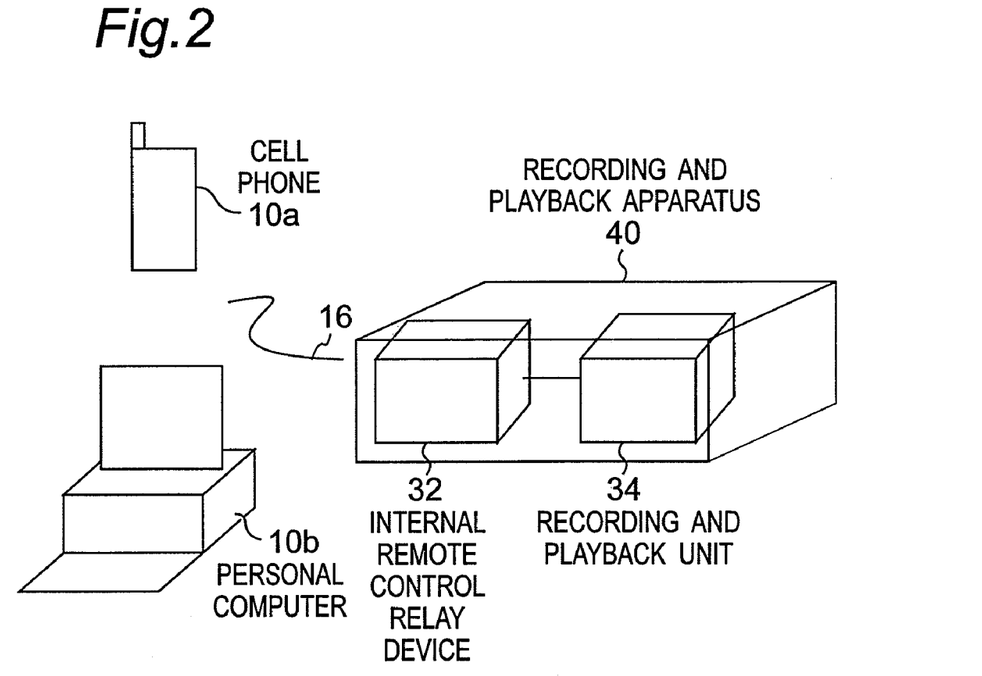
FIG. 2 is a block diagram showing another configuration of a remote control system in a first embodiment of the present invention.

FIG. 2 is a block diagram showing the configuration of a remote control system including a recording and playback apparatus 40 with an internal remote control relay device 32. FIG. 4 is a block diagram showing the configuration of this recording and playback apparatus 40 in detail. It is noted that following can be also related to the alternative example.

The recording and playback apparatus 40 has an internal remote control relay device 32 with the same configuration and function as the remote control relay device 20 described above, and a recording and playback unit 34 containing the content recording and playback functions. Because this recording and playback apparatus 40 has the remote control relay device 32 internally disposed, it can be treated as a single product.

For simplicity two types of data are exchanged between the communication controller 11 of the external device 10 and the communication controller 21 of the remote control relay device 20, control data and display data.

This control data means data used to enable communication with the device attempting communication (access), i.e., data essential to the communication protocol. For example, this control data is typically a user ID, password, or other data unique to a specific user, and the IP address or other data unique to the device. Data other than this control data is differentiated as "display data." "Data" alone means both control data and display data.

Figure 7:
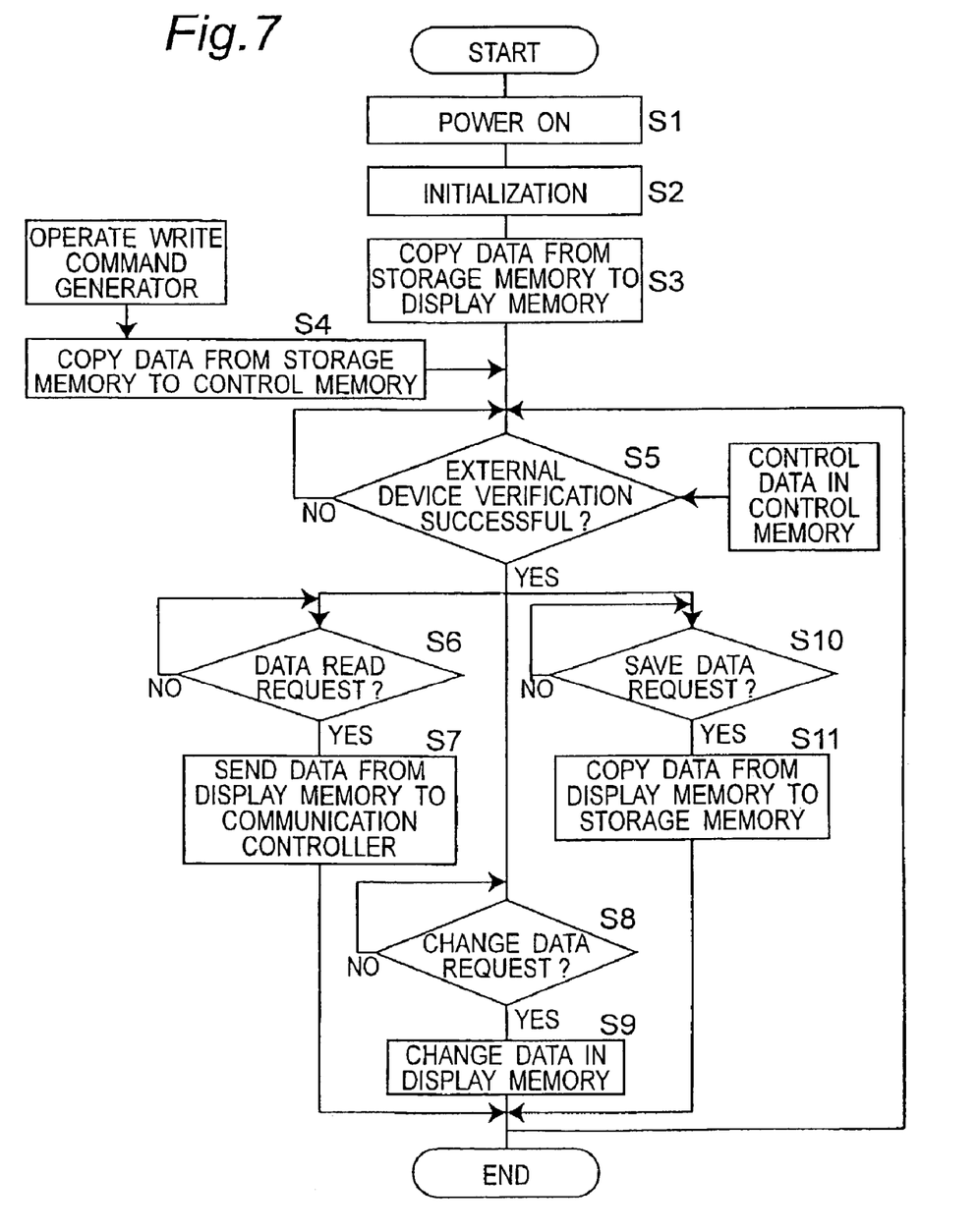
FIG. 7 is a flow chart of the operation of the remote control relay device in the first embodiment of the invention.

The remote control relay method of this remote control relay device 20 is described next with reference to FIG. 7. FIG. 7 is a flow chart of the operation of the Web controller 22.

(1) Step S1 is a power-on step for either turning the power on to or resetting the remote control relay device 20.

(2) Step S2 is an initialization step for setting the initial values for various data settings of the remote control relay device 20.

(3) Step S3 is a display memory storage step for storing data stored in the storage memory 24 to the display memory 23.

(4) Step S4 is the control memory storage step for saving data stored in the storage memory 24 to the control memory 25 according to an operation of the write command generator 28.

(5) Step S5 is a verification step for authenticating the external device 10 or user of the external device 10 according to the control data in control memory 25.

(6) Step S6 is a reference request detection step for detecting requests from the external device 10 to read reference data.

(7) Step S7 is a data transmission step for sending data in display memory 23 to the external device 10 when a data reference request from the external device 10 is detected.

(8) Step S8 is a change request detection step for detecting a request from the external device 10 to change data.

(9) Step S9 is a change-data step for changing data in the display memory 23 when there is a change-data request from the external device 10.

(10) Step S10 is a storage request detection step for detecting requests from the external device 10 to save data.

(11) Step S11 is a data storage step for storing data in the display memory 23 to the storage memory 24 when a data storage request is detected from the external device 10.

Operation of this remote control relay device is described next with reference to the flow chart in FIG. 7.

(a) First, in the power-on step S1 the remote control relay device 20 is turned on.

(b) Next, various default settings required for operation of the remote control relay device 20 are set to specific initial values in the initialization step (S2).

It should be noted that turning the power on refers both to the action of actually starting to supply power to the remote control relay device 20 from the power supply 26, and to resetting the power supply by means of a reset circuit (not shown in the figure).

(c) Next, data stored to the storage memory 24 is read and written to the display memory 23 in the display memory storage step (S3).

(d) In order to rewrite the control data stored in the control memory 25 of the remote control relay device 20 configured as described above, a write command is asserted from the write command generator 28 to the Web controller 22 in an off-line mode, that is, not over the network. The write command generator 28 of the remote control relay device 20 is set up so that it cannot be operated over the network. More specifically, the write command generator 28 cannot be operated from an external device 10 via the network, and it can only be operated via commands applied directly thereto, i.e., not over the network. A pushbutton, for example, could be provided as the write command generator 28 of the remote control relay device 20. The write command is then output only when the user directly presses this button on the remote control relay device 20.

(e) Next, when the write command is input to the Web controller 22, the Web controller 22 reads the control data stored in the storage memory 24 and saves the control data to the control memory 25 in the control memory storage step (S4). As a result, if the user has previously changed control data in the storage memory 24 via the network, those changes can be reflected in the authentication process, for example.

Furthermore, if the control data was illicitly changed by an unauthorized user that penetrated the system, the control data in the control memory 25 is secure and will not be rewritten because the authorized user has not directly operated the write command generator 28. In addition, if the user wants to not rewrite the data in the control memory 25, the authorized user simply does not perform this non-network operation (i.e., operating the write command generator 28 directly) and the control data in the control memory 25 will therefore not be rewritten. Control then passes to the next step.

(f) Next, if the remote control relay device 20 has been accessed over the network from the external device 10, the verification step determines if the protocol received from the external device 10 can be used by the remote control relay device 20. This protocol check is done by the Web controller 22 reading the control data from the control memory 25 to the communication controller 21 and comparing the control data with the data received from the external device 10.

(g) Whether the user of the external device 10 is an authorized user as set in the remote control relay device 20 is then determined. This user authentication process is done by the Web controller 22 reading control data from the control memory 25 to the communication controller 21, and comparing the control data with the user ID, password, and other verification data received from the external device 10.

Only control data stored in the control memory 25 is used for the protocol check and user verification processes described above. That is, control data is stored to the display memory 23 and storage memory 24, but because this control data could be illicitly changed by an unauthorized user it is not used for protocol checking and user verification.

If the verification step (S5) determines that the protocol from the external device 10 cannot be used on the remote control relay device 20, or if authentication of the user of the external device 10 fails, the user is prevented from operating the Web controller 22 of the remote control relay device 20. User access to the Web controller 22 is permitted only when the protocol is confirmed usable by the remote control relay device 20 and the user authentication succeeds.

(h) When authentication succeeds in step S5 and the Web controller 22 can be used, what the protocol from the external device 10 is requesting of the remote control relay device 20 is determined and the Web controller 22 operates according to the request. The external device 10 user can thus perform the following three operations using the remote control relay device 20.

(i) First, data stored in the display memory 23 can be referenced. Requests from the external device 10 to reference data are passed through the communication controller 21 to the Web controller 22. These requests are detected in the reference request detection step (S6). Then in the data transmission step (S7), the Web controller 22 reads the data from the display memory 23 to the communication controller 21, and sends the data from the communication controller 21 to the external device 10.

(j) Second, data stored in the display memory 23 can be changed. Requests from the external device 10 to change data are passed through the communication controller 21 to the Web controller 22. These requests are detected in the change request detection step (S8).

Figure 5:
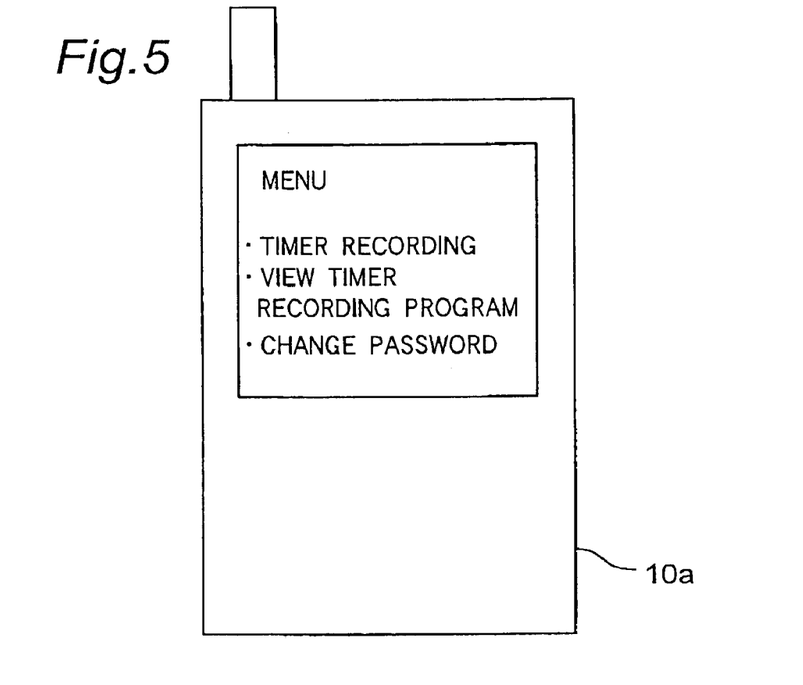
FIG. 5 shows an example of a menu displayed on a user screen when the external device is a cell phone.
Figure 6:
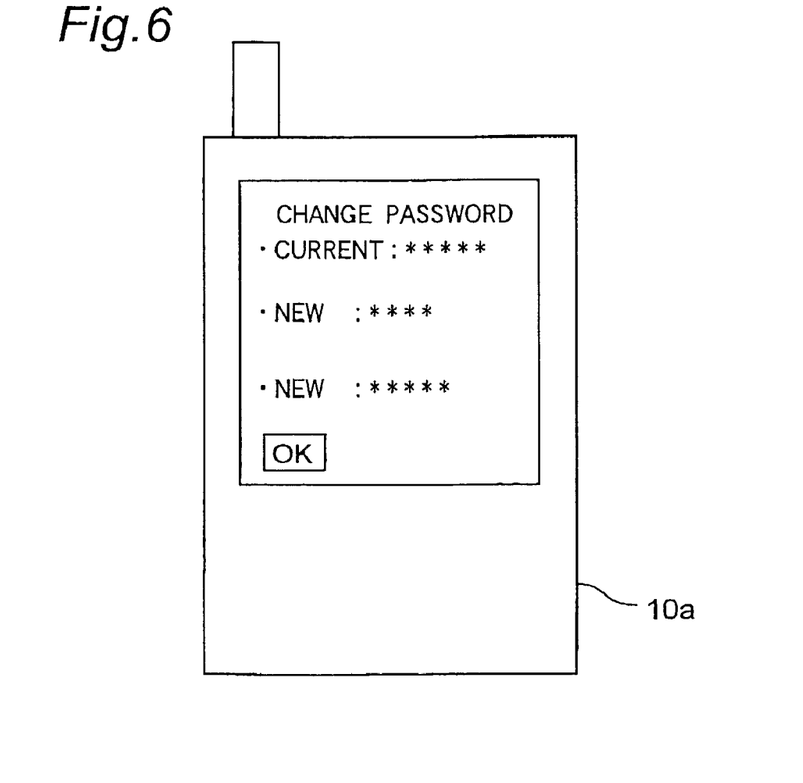
FIG. 6 shows an example of a display screen when the user select Change Password and executes the change from the screen shown in FIG. 5.

This request to change data could be, for example, a request to change the user password sent from a menu on the cell phone 10a as shown in FIG. 5. The Web controller 22 then controls writing the changed data or new data to the display memory 23 through the communication controller 21 and Web controller 22 in step S9. This could result in the current password being changed to a new password from a Change Password screen such as shown in FIG. 6.

(k) Third, data in the display memory 23 can be copied to the data storage memory 24. Data storage requests from the external device 10 are passed through the communication controller 21 to the Web controller 22. These requests are detected in the storage request detection step (S10). Next, in the data storage step (S11) data in the display memory 23 is copied to the data storage memory 24 by the Web controller 22. An example of this is shown in FIG. 6 where the user clicks an OK button in the Change Password screen on the cell phone 10a to store the new password to the storage memory 24.

(l) When operation by the user of the external device 10 ends, the remote control relay device 20 waits for a next access from the external device 10, or the Web controller 22 stops operating if the remote control relay device 20 power is turned off.

A remote control relay device according to this first embodiment of the present invention thus has a write command generator 28 that cannot be operated using an external device 10 over a network. Because the content of the control memory 25 is not rewritten unless a write command is applied by the write command generator 28 to the Web controller 22, writing the control memory 25 using an external device 10 over a network is rendered impossible.

This means that an unauthorized user not enabled by the authorized user to access the system cannot access the remote control relay device 20 over a network and illicitly write to the control memory 25. The control data in the control memory 25 used for external device 10 authentication therefore cannot be rewritten from an external device 10 unless specifically intended by the authorized user. The authorized user can therefore be assured of access to the external device 10 even if the system is accessed by an unauthorized user because tampering with the control data is not possible.

When the control data is changed the user could also be notified that the control data was changed the next time the system responds to access from an external device. A change in control memory 25 content could also be reported automatically to a preregistered contact, such as by calling a preregistered telephone number.

Embodiment 2

Figure 8:
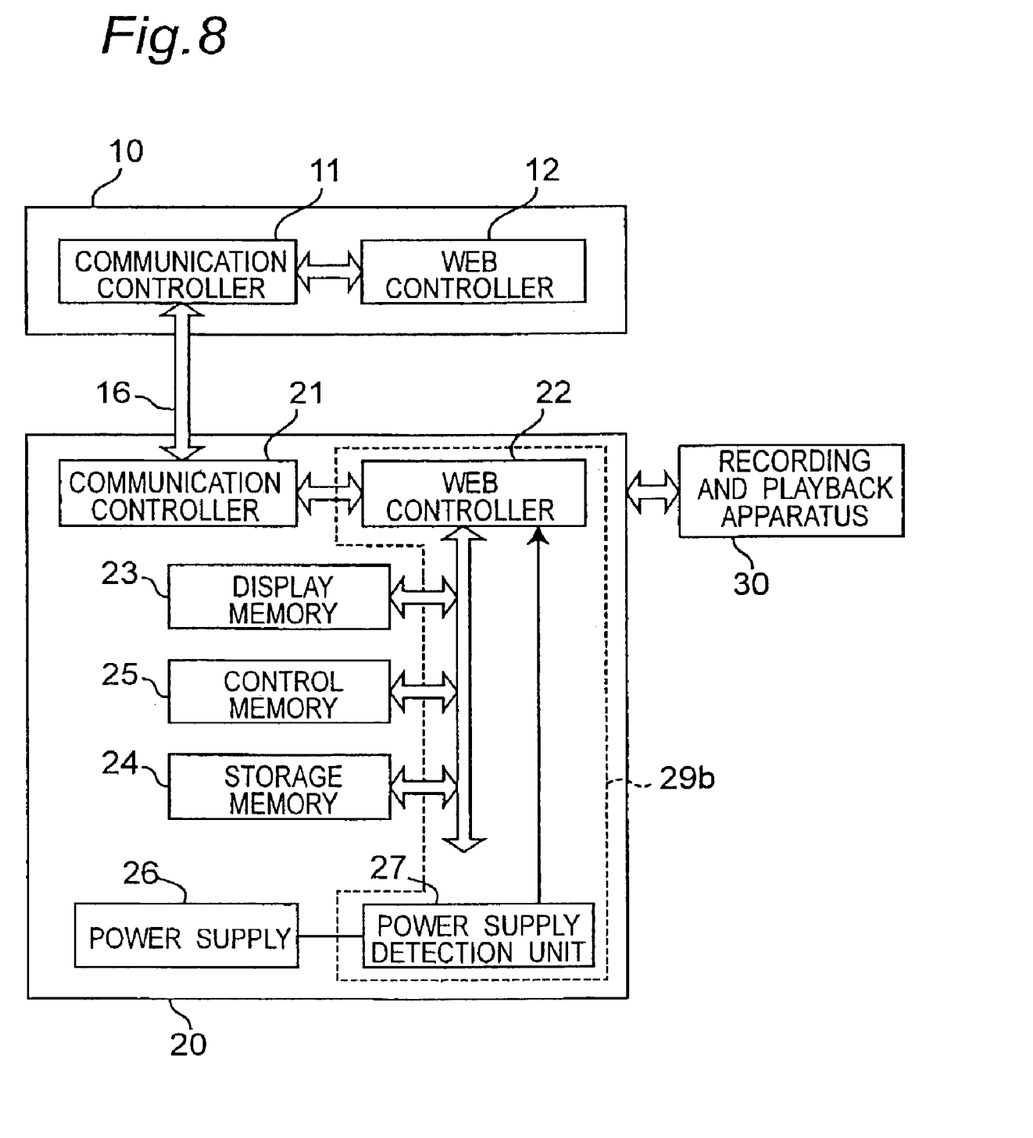
FIG. 8 is a block diagram showing the configuration of a remote control system according to a second embodiment of the invention.

A remote control relay device according to a second embodiment of this invention is described next with reference to FIG. 8. FIG. 8 is a block diagram showing the configuration of this remote control relay device. The remote control relay device 20 in this embodiment differs from that in the above first embodiment in that it has a power supply detection unit 27 in place of the write command generator 28. This power supply detection unit 27 is a circuit for detecting a rise in the power supply voltage and outputting a write command. The Web controller 22 and power supply detection unit 27 could also be combined as a single writing control unit 29b.

Figure 9:
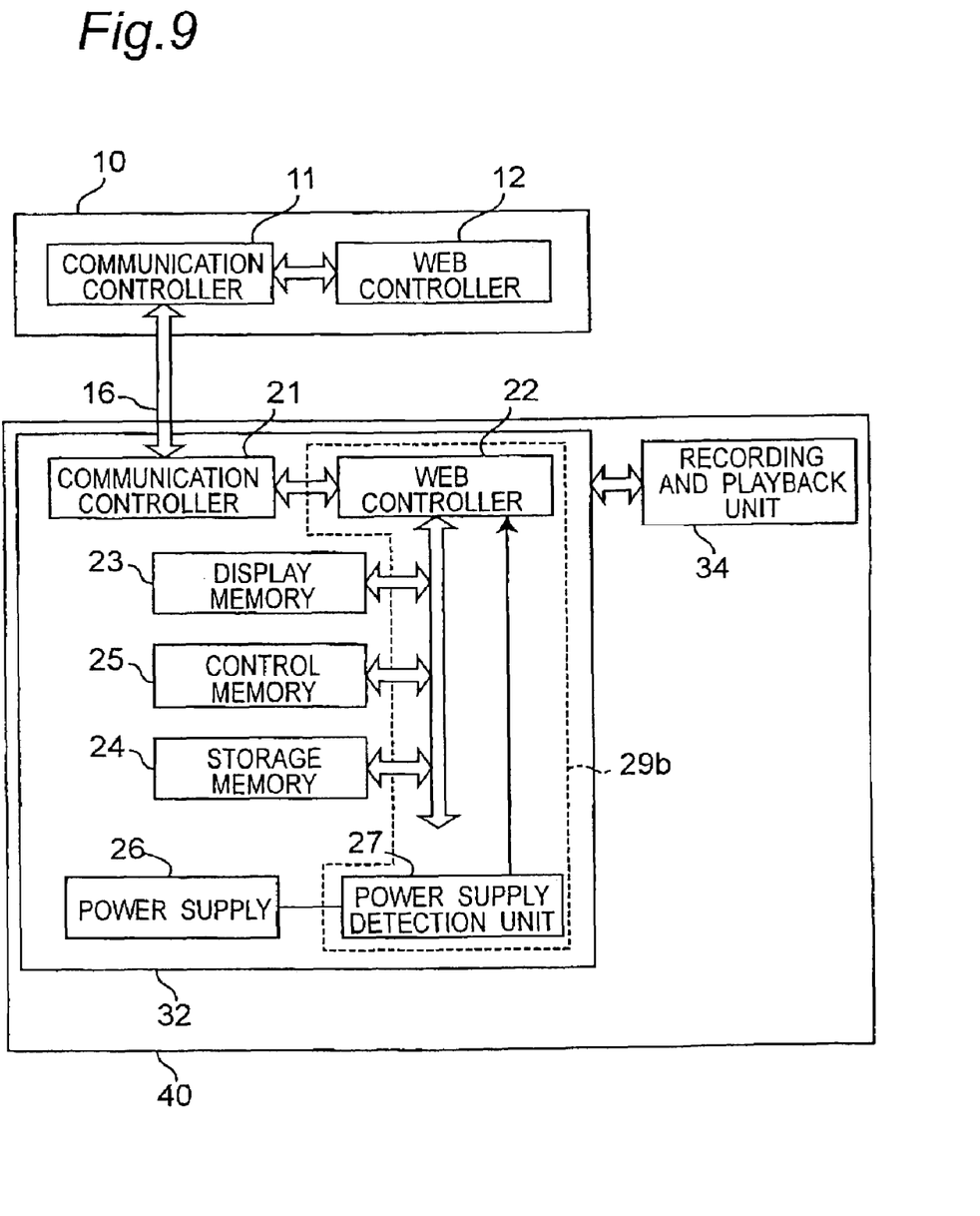
FIG. 9 is a block diagram showing another configuration of a remote control system according to a second embodiment of the invention.

A recording and playback apparatus 40 according to another example of the remote control relay device in this second embodiment is shown in FIG. 9. FIG. 9 is a block diagram showing the configuration of the recording and playback apparatus 40 in detail. It is noted that following can be also related to the another example.

This recording and playback apparatus 40 has an internal remote control relay device 32 with the same configuration and function as the remote control relay device 20 shown in FIG. 8, and a recording and playback unit 34 containing the content recording and playback functions. Because this recording and playback apparatus 40 has the remote control relay device 32 internally disposed, it can be treated as a single product.

Figure 10:
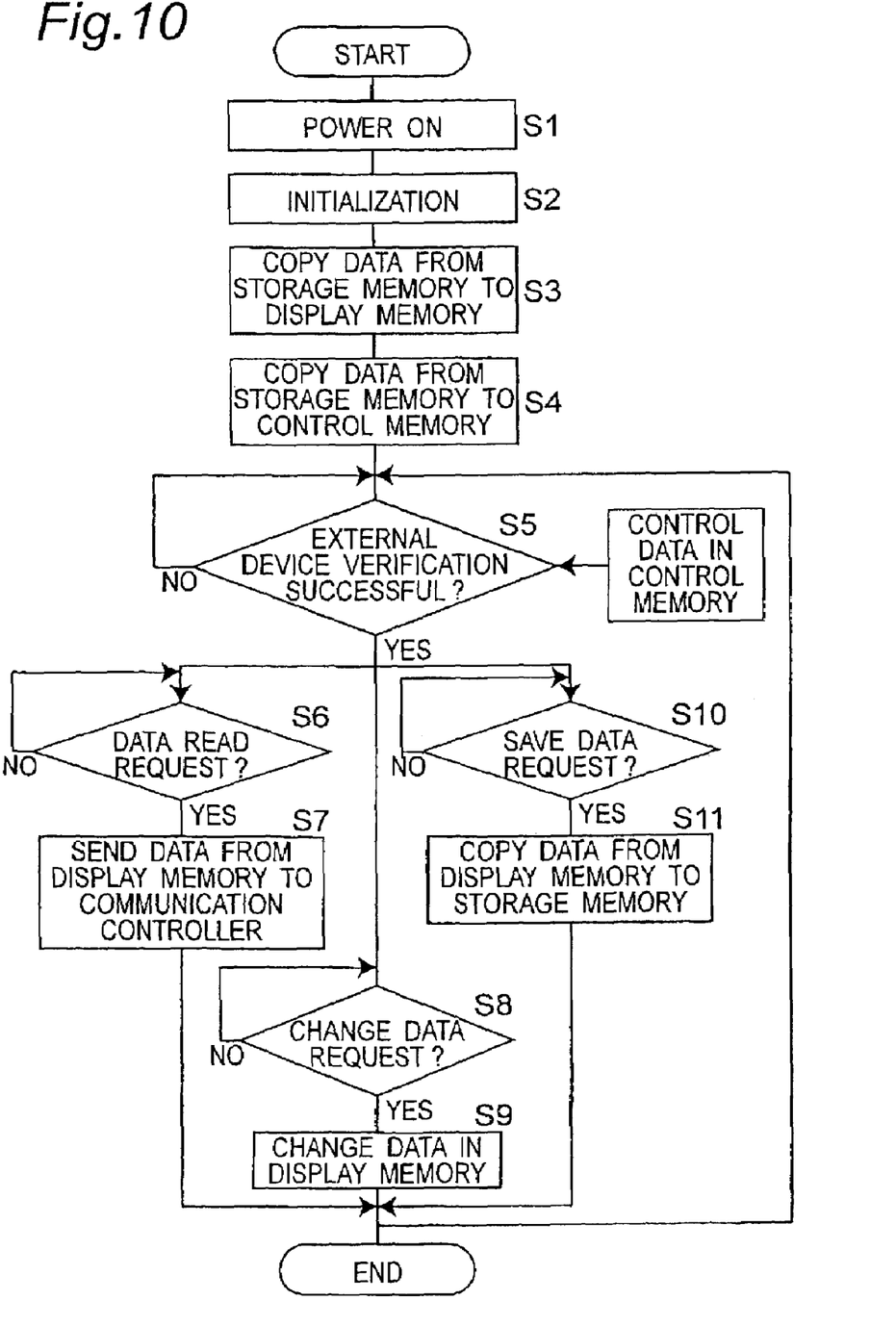
FIG. 10 is a flow chart showing the operation of a remote control relay device in the second embodiment of the invention.

The operation of a remote control system including a remote control relay device 20 according to this embodiment of the invention is described next with reference to the flow chart in FIG. 10.

(1) Step S1 is a power-on step for either turning the power on to or resetting the remote control relay device 20.

(2) Step S2 is an initialization step for setting the initial values for various data settings of the remote control relay device 20.

(3) Step S3 is a display memory storage step for storing data stored in the storage memory 24 to the display memory 23.

(4) Step S4 is the control memory storage step for saving data stored in the storage memory 24 to the control memory 25.

(5) Step S5 is a verification step for authenticating the external device 10 or user of the external device 10 according to the control data in control memory 25.

(6) Step S6 is a reference request detection step for detecting requests from the external device 10 to read reference data.

(7) Step S7 is a data transmission step for sending data in display memory 23 to the external device 10 when a data reference request from the external device 10 is detected.

(8) Step S8 is a change request detection step for detecting a request from the external device 10 to change data.

(9) Step S9 is a change-data step for changing data in the display memory 23 when there is a change-data request from the external device 10.

(10) Step S10 is a storage request detection step for detecting requests from the external device 10 to save data.

(11) Step S11 is a data storage step for storing data in the display memory 23 to the storage memory 24 when a data storage request is detected from the external device 10.

Operation of this remote control relay device is described next with reference to the flow chart in FIG. 10.

(a) First, in the power-on step S1 the remote control relay device 20 is turned on.

(b) Next, various default settings required for operation of the remote control relay device 20 are set to specific initial values in the initialization step (S2).

It should be noted that turning the power on refers both to the action of actually starting to supply power to the remote control relay device 20 from the power supply 26, and to resetting the power supply by means of a reset circuit (not shown in the figure). Note that in this embodiment the power supply 26 and power supply detection unit 27 cannot be operated from an external device 10 via the network. In other words, the power supply 26 and power supply detection unit 27 cannot be operated on-line, and can only be operated off-line.

(c) When power supply to the remote control relay device 20 starts or the power supply is reset, the power supply detection unit 27 detects the start of power supply to the remote control relay device 20 and outputs a write command to the Web controller 22.

(d) When the write command is applied thereto the Web controller 22 saves the data stored in the storage memory 24 to the display memory 23 in the display memory storage step (S3), and then saves the data stored in the storage memory 24 to the control memory 25 in the control memory storage step (S4).

(e) When the remote control relay device 20 is set up as described above and then accessed by an external device 10, control moves to the verification step S5. The verification step S5 determines if the protocol received from the external device 10 can be used by the remote control relay device 20, and then determines if the external device 10 or the user of the external device 10 is an authorized user as set in the remote control relay device 20.

This protocol check and user authentication are done by the Web controller 22 reading control data from the control memory 25 to the communication controller 21 and comparing the read control data with the data (user ID and password, for example) received from the external device 10.

That is, the control data is stored to the display memory 23 and storage memory 24, but for protocol and user verification purposes only data stored in the display memory 23 and control memory 25 is used.

If the verification step (S5) determines that the protocol from the external device 10 cannot be used on the remote control relay device 20, or if authentication of the user of the external device 10 fails, the user is prevented from operating the Web controller 22 of the remote control relay device 20. User access to the Web controller 22 is permitted only when authentication succeeds.

(f) If authentication succeeds in the verification step S5 and using the Web controller 22 is allowed, what the protocol from the external device 10 is requesting of the remote control relay device 20 is determined and the Web controller 22 operates according to the request. The external device 10 user can thus perform the following three operations using the remote control relay device 20.

(g) First, data stored in the display memory 23 can be read. Requests from the external device 10 to read data are passed through the communication controller 21 to the Web controller 22. These requests are detected in the reference request detection step (S6). Then in the data transmission step (S7), the Web controller 22 reads the data from the display memory 23 to the communication controller 21, and sends the data from the communication controller 21 to the external device 10.

(h) Second, data stored in the display memory 23 can be changed Requests from the external device 10 to change data are passed through the communication controller 21 to the Web controller 22. These requests are detected in the change request detection step (S8). The Web controller 22 then controls writing the changed data or new data to the display memory 23 through the communication controller 21 and Web controller 22 in step S9.

(i) Third, data in the display memory 23 can be copied to the data storage memory 24. Data storage requests from the external device 10 are passed through the communication controller 21 to the Web controller 22 These requests are detected in the storage request detection step (S10). Next, in the data storage step (S11) data in the display memory 23 is copied to the data storage memory 24 by the Web controller 22.

(j) When operation by the user of the external device 10 ends, the remote control relay device 20 waits for a next access from the external device 10, or the Web controller 22 stops operating if the remote control relay device 20 power is turned off.

As described above, this remote control relay device of the invention has a power supply detection unit 27. The control memory 25 can be written simultaneously to turning the remote control relay device 20 power on, thereby simplifying the remote control relay device 20 startup process. If the control memory 25 is volatile storage, such as DRAM (dynamic random access memory), the control memory 25 must be written when the remote control relay device 20 starts up. User convenience is thus improved by writing data to control memory 25 when the power is supplied to the remote control relay device 20.

A remote control relay device according to the present invention features a write command generator that cannot be operated by an external device over a network. Furthermore, control data changed by the user of an external device cannot be written to control memory unless a write command is applied to the Web controller from the write command generator. It is therefore not possible to change the control data used for authentication in control memory by accessing the system over a network with an external device. Therefore, even if the system is accessed by an unauthorized user over a network, access by authorized users from an external device is always assured.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The present disclosure relates to subject matter contained in priority Japanese Patent Application No. 2002-87853, filed on Mar. 27, 2002, the contents of which is herein expressly incorporated by reference in its entirety.

What is claimed is:

1. A remote control relay device connected between a network and a controlled device that is remotely controlled from an external device over the network, the remote control relay device comprising:
   a communication controller that exchanges control data with the external device over the network;
   a storage memory that stores control data;
   a control memory that stores control data used for external device authentication;
   a write controller that controls sending and receiving of control data by the communication controller, reading of control data stored in the storage memory, and writing of the control data read from the storage memory to the control memory only in response to operations that are not executed over the network the write controller further comprising:
      a web controller that controls the storage memory, the control memory and the control data communication by the communication controller; and
      a write command generator that sends to the web controller a write command for reading control data stored to the storage memory and for writing the control data to the control memory; and
   a power supplier;
   wherein the write command generator comprises a power supply detector that generates the write command to the web controller, when the power supplier starts supplying power;
   wherein the web controller reads and writes control data from the storage memory to the control memory only when it receives the write command; and
   wherein the power supplier, the power supply detector, and the write command generator cannot be operated from the external device over the network.

2. A recording and playback apparatus remotely controllable from an external device over a network, comprising:
   a remote control relay device connected through the network to the external device; and
   a recording and playback unit connected to the remote control relay device;

wherein the remote control relay device comprises:
- a communication controller that exchanges control data with the external device over the network,
- a storage memory that stores control data,
- a control memory that stores control data used for external device authentication, and
- a write controller configured to control that controls sending and receiving of control data by the communication controller, reading of control data stored in the storage memory and writing of the control data read from the storage memory to the control memory only in response to off-line operations, the write controller further comprising:
  - a web controller that controls the storage memory, the control memory and the control data communication by the communication controller; and
  - a write command generator that sends to the web controller a write command for reading control data stored to the storage memory and for writing the control data to the control memory; and
  - a power supplier;
- wherein the write command generator comprises a power supply detector that generates the write command to the web controller, when the power supplier starts supplying power;
- wherein the web controller reads and writes control data from the storage memory to the control memory only when it receives the write command; and wherein the power supplier, the power supply detector, and the write command generator cannot be operated from the external device over the network.

* * * * *

UNITED STATES PATENT AND TRADEMARK OFFICE
CERTIFICATE OF CORRECTION

PATENT NO. : 7,321,934 B2
APPLICATION NO. : 10/396470
DATED : January 22, 2008
INVENTOR(S) : Koji Hirose It is certified that error appears in the above-identified patent and that said Letters Patent is hereby corrected as shown below:

At column 12, line 42 (claim 1, line 15), after "network" insert -- , --

At column 13, line 7 (claim 2, line 13), after "a write controller" delete "configured to control"

Signed and Sealed this

Twelfth Day of August, 2008

JON W. DUDAS
*Director of the United States Patent and Trademark Office*